Nov. 29, 1966  K. A. BLENKARN  3,287,801
METHOD FOR LINING PIPE UNDER PRESSURE
Filed Nov. 26, 1962  3 Sheets-Sheet 1

KENNETH A. BLENKARN, INVENTOR.

BY *Arthur McIlroy*

ATTORNEY

Nov. 29, 1966  K. A. BLENKARN  3,287,801
METHOD FOR LINING PIPE UNDER PRESSURE
Filed Nov. 26, 1962  3 Sheets-Sheet 2

KENNETH A. BLENKARN, INVENTOR.

BY *Arthur McElroy*

ATTORNEY

Nov. 29, 1966  K. A. BLENKARN  3,287,801
METHOD FOR LINING PIPE UNDER PRESSURE
Filed Nov. 26, 1962  3 Sheets-Sheet 3

KENNETH A. BLENKARN INVENTOR.

BY Arthur McIlroy

ATTORNEY

United States Patent Office 3,287,801
Patented Nov. 29, 1966

3,287,801
METHOD FOR LINING PIPE UNDER PRESSURE
Kenneth A. Blenkarn, Tulsa, Okla., assignor to Pan American Petroleum Corporation, Tulsa, Okla., a corporation of Delaware
Filed Nov. 26, 1962, Ser. No. 240,030
7 Claims. (Cl. 29—460)

This invention relates to a method and apparatus for applying a protective coating to the inside of pipe. More particularly, it concerns means for casting a cement lining in pipe under pressure whereby relative movement of the pipe in lining is prevented under the conditions of either high or low fluid pressure in the pipe.

In copending application S.N. 237,107 Bearden et al., filed November 13, 1962, a method is described for placing a cement lining in pipe while the pipe is stressed to a value not exceeding 75–80 percent of its yield strength. Generally, speaking, this is accomplished by spinning the pipe so that the cement slurry is deposited in a substantially uniform layer. The ends of the pipe are sealed and a fluid pressure is applied to the inside of the pipe to produce the necessary stress in the pipe as the cement sets. The spinning may be discontinued when the cement has been compacted enough to retain its cylindrical shape; however, fluid pressure is maintained until the cement is strong enough to resist residual stresses created by release of pressure. When pressure is released, expansion of the cement and contraction of the pipe give rise to residual compressive stresses in the cement. A cement lining which is prestressed in this manner resists cracking when during future service the pipe is subjected to internal pressure. In this manner cracking of the cement lining as well as its separation from the pipe are avoided, thus preventing corrosive fluids from contacting the metal.

Cement does not make a chemical bond with steel, therefore, the mechanical bond afforded by the surface irregularities of the pipe provides the only restraint to the movement of the lining in relation to the pipe. When pipe is lined by centrifugal casting under pressure, differential movement of the pipe and lining may occur when the pressure inside the pipe is released after the cement has set. The differential movement is produced by the longitudinal contraction of the pipe and the expansion of the lining at this time. When fluid pressure is applied to the pipe during the lining operation, there is both radial and longitudinal expansion. The cement slurry, on the other hand, is affected by the compressive forces according to the bulk modulus of the solid components of the slurry. The cement hardens in compression and in the absence of any tensile stresses. A primary effect of releasing the pressure in the pipe is the expansion of the cement lining owing to its bulk modulus. The radial expansion of the cement lining and the radial contraction of the pipe combine to increase the contact pressure and therefore the mechanical bond between the lining and the pipe, which resists the differential longitudinal movement. Nevertheless, movement sometimes occurs and breaks the weak bond between the pipe and the cement whereby corrosive fluids can contact the metal surface.

It is therefore an object of my invention to provide a method for the centrifugal casting of a cement lining in pipe under pressure. It is also an object to prevent the differential movement of the lining and pipe when the fluid pressure changes in the pipe. A further object is to produce a stressed cement lining in pipe which resists the opening of cracks therein. These and other objects are accomplished by my invention described in detail hereinafter with reference to the accompanying drawings.

According to my invention, differential movement of the pipe and cement lining is prevented by providing internal upsets at the ends of the pipe so that the longitudinal compressive force in the cement will be offset by the tensile force in the pipe when the fluid pressure in the pipe is released. In the alternative, the differential movement in the pipe and lining may be eliminated by compressing the pipe during casting so that when casting pressure is released, longitudinal extension of the pipe will equal that of the lining.

Figure 1:
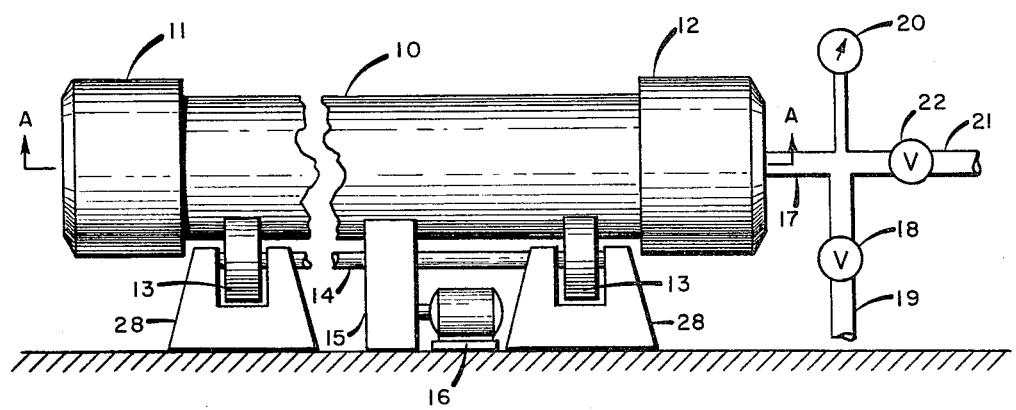
FIGURE 1 is an over-all view of one form of the pressure centrifugal casting equipment.

Referring to FIGURE 1 for a description of the apparatus, pipe 10 is sealed at each end by caps 11 and 12. The pipe rests on wheels 13 in cradles 28 so that it can be rotated by motor 16 through gear box 15 and shaft 14 which drives the wheels on one side of the cradles. This apparatus for supporting and rotating the pipe is similar to that described in U.S. Patent 2,486,420 Kennison which has four rollers with at least one of them driven by a motor. A high pressure fluid communicates with the interior of the pipe by way of line 21 and valve 22. Gage 20 indicates the pressure in the pipe. High pressure fluid can be vented from the apparatus through valve 18 in line 19.

Figure 2:
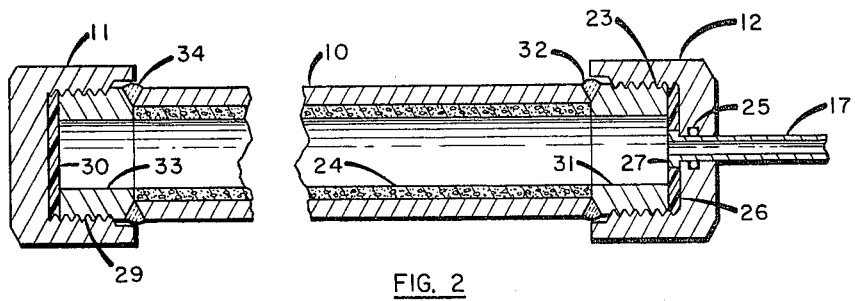
FIGURE 2 is a view in cross-section taken at A—A in FIGURE 1 illustrating one form of an internal upset in the end of the pipe which may be used in accordance with my invention.

One form of an internal upset at the ends of the tubing to be lined is shown in FIGURE 2. Nipples 31 and 33 are joined to the ends of pipe 10 at welds 32 and 34. The internal diameter of the nipples is approximately equal to that of cement lining 24. Their outside surface is threaded for engagement with caps 11 and 12 during the lining operation and later for coupling with other joints of pipe. Plastic plates 26 and 30 seal threaded connections 23 and 29 so that cement slurry cannot enter and bind the connections. Pressure fluid inlet tube 17 swivels in cap 12 and is held by flange 27. Fluid leakage between the cap and tube is prevented by O-ring seal 25. Nipples 31 and 33 may be made of a metal having greater corrosion resistance than the pipe to the fluids handled since they are not covered by the lining.

Figure 3:
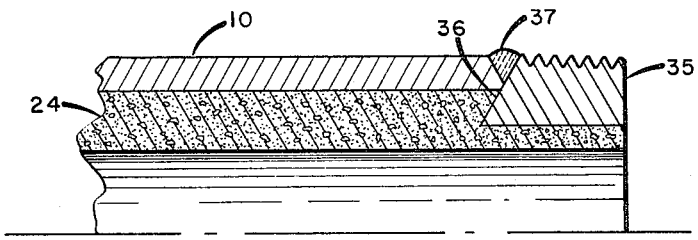
FIGURE 3 is another view similar to that in FIGURE 2 showing another type of internal upset.

A nipple which may be coated with cement is shown in FIGURE 3. Nipple 35 is thinner than nipple 31 in FIGURE 2 so that it will be covered with a thin layer of the cement during the centrifugal casting step. Face 36 on the nipple below weld 37 forms an acute angle with the inside surface of pipe 10 to resist the tendency of the lining to slide over the face at the high thrust produced when the casting pressure is released.

Figure 4:
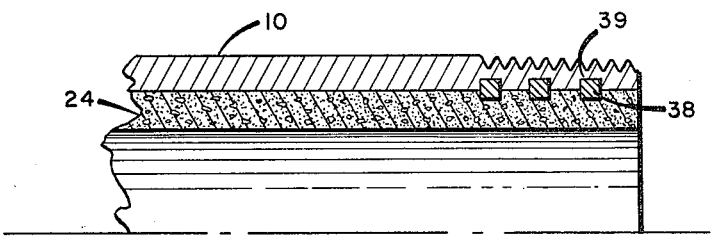
FIGURE 4 is similar to FIGURES 2 and 3 in that it shows an alternative design for the internal upset.

Another type of internal upset which may be covered by the cement lining is shown in FIGURE 4. One or more rings 38 may be placed in circular keyways 39 near the end of the pipe. These rings snap into the keyways, fitting snugly and protruding into the interior of the pipe a distance equal to about one-half to three-fourths of the thickness of the lining. The cement slurry packs tightly around these rings during the centrifugal casting step whereby they can resist differential movement when the casting pressure is released.

Figure 5:
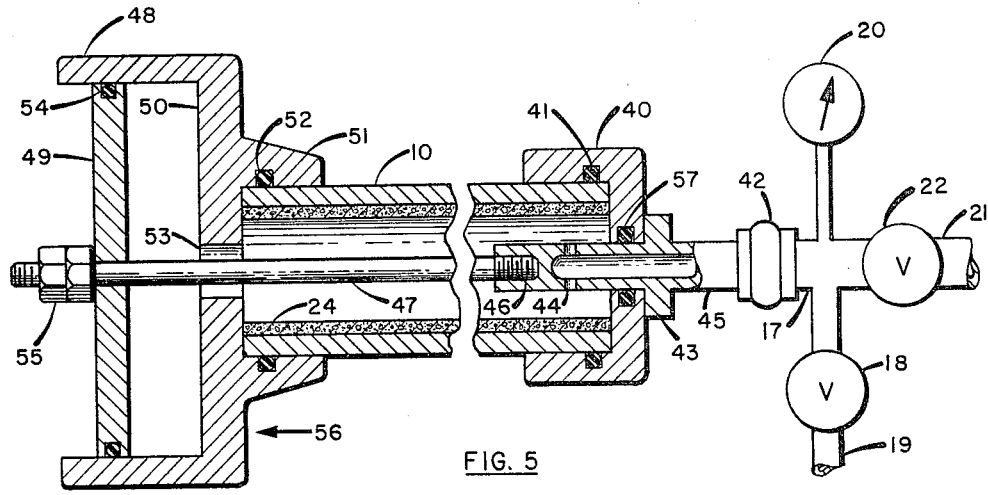
FIGURE 5 is a cross-sectional view of apparatus for compressing the pipe longitudinally as it is lined under pressure.

FIGURE 5 illustrates a method of preventing differential movement by compressing the pipe longitudinally during the casting operation. Pipe 10 shown here with plain ends is closed at one end by cap 40 having O-ring 41 to effect a fluid seal. The other end is closed by fluid motor 56. The motor comprises piston 49 in cylinder 48 with O-ring 54 making a fluid seal between the piston and cylinder. Motor base 50 is pivoted on the end of the pipe with collar 51 aligning the fluid motor with the longitudinal axis of the pipe. O-ring 52 provides a fluid seal between the pipe and collar. Pressure fluid in the pipe communicates with the fluid motor via port 53 in the base. Piston 49 is attached to one end of piston rod 47 by nuts 55. The piston rod passes along the axis of the pipe with its other end attached to pressure fluid inlet tube 45 at threaded socket 46. The inlet tube extends through O-ring seal 57 in cap 40. Flange 43 holds the tube when fluid pressure is applied to the pipe and fluid motor. Pressure fluid is admitted to the apparatus via inlet tube 45 and ports 44 therein. Swivel 42 permits rotation of the apparatus while it is connected to fluid inlet 17.

Figure 6:
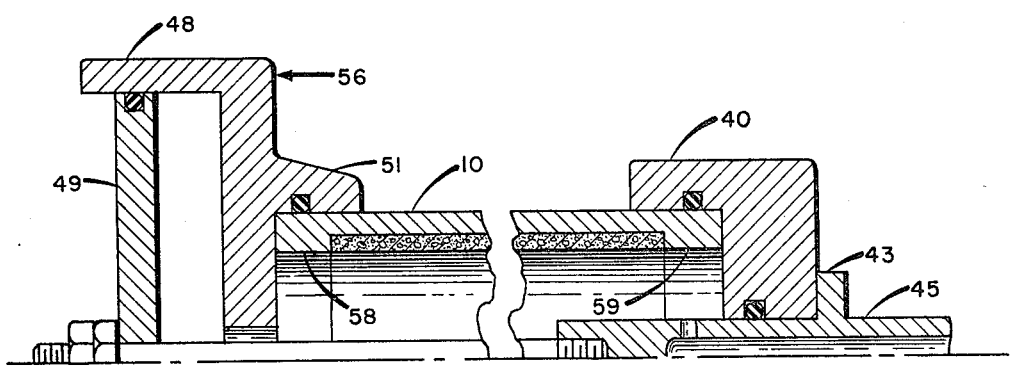
FIGURE 6 illustrates the use of the apparatus of FIGURE 5 with pipe having internally upset ends.

FIGURE 6 shows a partial cross-section of the apparatus illustrated in FIGURE 5. This method for preventing differential movement utilizes internal upsets 58 and 59 in pipe 10 as well as compression of the pipe by fluid motor 56.

In practicing my invention wherein an internal upset is provided at each end of the pipe as illustrated in FIGURES 2, 3, 4, and 6, the pipe is first cleaned to remove grease, rust, scale and the like, then the upset is produced. Nipple 31 is attached to pipe 10 by weld 32, then nipple 33 is attached to the other end by weld 34. The internal diameter of these nipples is equal to the internal diameter of the cement lining to be applied. Thereafter a quantity of cement slurry is deposited uniformly along the length of pipe 10, then caps 11 and 12 with plastic sealing plates 26 and 30 are attached to the nipples by threaded connections 23 and 29. The closed pipe is then rotated about its longitudinal axis in a horizontal plane using the centrifugal casting apparatus shown in FIGURE 1. Motor 16 drives wheels 13 through gear box 15 and shaft 14 which is journaled in cradles 28. The centrifugal force produced by spinning the pipe spreads the cement in uniform layer 24 between the upsets provided by nipples 31 and 33. While the cement is still plastic, fluid pressure is admitted to the pipe from line 21 by opening valve 22. The pressure in the apparatus, indicated by gage 20 on inlet tube 17, is preferably held at a level which stresses the pipe to a level not to exceed 75–80% of its yield value. The pipe is spun under pressure until a lining consisting of the solids in the slurry is compacted against the pipe tightly enough that it stays in place when the centrifugal force is removed. At that time, the pipe may be removed from the spinning apparatus in order that other pipes may be lined while the cement is developing strength. Fluid pressure is maintained on the pipe until the cement has gained sufficient compressive strength to resist collapsing by the elastic expansion of the cement and contraction of the pipe when the pressure is released.

The length of time required for the cement to gain strength varies with the temperature and type of cement. The amount of strength required to prevent failure depends upon the relative thickness of the pipe and cement lining as well as the modules of elasticity of each material. The curing time of the cement may be shortened by mixing set accelerators with the cement as well as by heating the slurry. Steam may be used both as a pressure fluid and to reduce the curing time. The pipe joints may be placed in an oven to cure under pressure following the spin cycle. When the lining has developed sufficient strength, the fluid pressure may be vented by opening valve 18 in drain line 19, then caps 11 and 12 removed. The ends of the pipe should be closed with an inexpensive cap to prevent drying of the lining during storage.

The stresses produced in the lining may be calculated to determine when the casting pressure may be relieved. For example a ½ inch cement lining cast in 6 inch line pipe, schedule 40, having an O.D. of 6.625 inches and a wall thickness of 0.280 inch, using nipples of the type shown in FIGURE 2 and a casting pressure of 500 pounds per sq. in. has a residual hoop stress in the lining of 1200 pounds per sq. in. and a longitudinal compressive stress of 640 pounds per sq. in. Therefore, the fluid pressure must be held on the pipe until the compressive strength of the cement exceeds 1200 pounds per sq. in. to avoid failure of the lining.

Pipe is lined using nipples of the type illustrated in FIGURES 3 and 4 using the same procedure as described above in relation to FIGURE 2. Sufficient cement slurry should be used with this type of upset to produce a thin layer of cement over nipple 35 or rings 38.

Differential movement may also be prevented by compressing the pipe longitudinally during centrifugal casting under pressure using fluid motor 56 illustrated in FIGURES 5 and 6. A cement slurry is deposited in cleaned pipe 10, then one end is closed with cap 40 having O-ring seal 41 between the cap and pipe. Pressure fluid inlet tube 45 extends through O-ring seal 57 in the center of cap 40. Piston rod 47, connected to the inlet tube at threaded socket 46, extends along the longitudinal axis of the pipe. Thereafter collar 51 on motor base 50 is placed over the other end of pipe 10 with O-ring 52 providing a fluid seal between the collar and pipe. Piston rod 47 extends through port 53 in base 50. With valve 18 in drain line 19 open, piston 49 can be inserted in cylinder 48, then attached to piston rod 47 with nuts 55. Valve 18 is then closed and valve 22 opened to admit pressure fluid. The pipe is rotated with the apparatus shown in FIGURE 1 to cast the cement solids in a uniform layer. Swivel 42 between inlet tubes 45 and 17 permits rotation of the pipe and its associated apparatus while tube 17 remains stationary. Pressure fluid entering pipe 10 via ports 44 in tube 45 passes through port 53 in fluid motor 56. The pressure acting against piston 49 produces a tension in rod 47 which is restrained by cap 40. The diameter of piston 49 is greater than the diameter of pipe 10 at O-ring seal 41, therefore the pipe will be compressed by a force equal to the product of the fluid pressure and the difference between the area of the piston and the area inside the O-ring seal. When the cement lining has developed sufficient strength to resist failure upon the release of the fluid pressure in the pipe, the pressure is released by opening valve 18. As the fluid pressure decreases, the cement lining has a tendency to expand both radially and longitudinally owing to the bulk modules of the cement. At the same time, the fluid motor releases the longitudinal compression on the pipe so that it can elongate. Since both the pipe and the lining are elongated, the differential movement is reduced or eliminated. The contact pressure between the pipe and the cement lining increases as the fluid pressure is decreased. The tensile stress in the pipe owing to the fluid pressure is restrained by the compressive forces in the cement. Additionally, radial expansion of the cement owing to its bulk modulus restrains the tension in the pipe, thereby increasing the contact pressure which resists differential longitudinal movement. In releasing the fluid pressure in the pipe, it is desirable to release it gradually, e.g., over a period of 2–5 minutes, to prevent spalling and cracking by fluids trapped in pores in the cement.

Internal upsets 58 and 59 in pipe 10 as shown in FIGURE 6 are used in combination with the compressional loading by fluid motor 56 to prevent differential movement. This arrangement is particularly useful where the thickness of the lining to be placed in the pipe is insufficient to resist compressive failure owing to the longitudinal tensile stress in the pipe when the lining is placed without longitudinal compression in the pipe. Also, lower compressive loading by the fluid motor than required with the arrangement of FIGURE 5 is possible since the upsets will prevent contraction of the pipe.

Either gas or liquid or a mixture of both may be used as the pressure fluid. It is generally preferred to use a gas because liquids might interfere with the setting characteristics of the cement. Also, pressure control is usually easier with gas than with liquid. Steam is a convenient gas since it also provides heat to accelerate setting. Water which condenses from the steam may be drawn off periodically through drain line 19; however, care must be taken to prevent a reduction in the fluid pressure in the pipe which might disrupt the lining.

Any of the cement compositions used to line pipe can be used in my pressure lining process. Pozzolanic additives such as blast furance or cupola slag, silica flour, sand, etc. may be mixed with the cement to reduce shrinkage. From about 0.5 to about 1.5 parts by weight of pozzolana to 1 part of cement may be used. Ordinary Portland type cement is suitable for handling most liquids. Lumnite cement may be used when the lining will be subjected to fluids at high temperature.

It shoud be understood that the apparatus which has been discussed in illustrating my invention can be modified easily to use with pipe having ends which are threaded, flanged, plain or grooved. Other variations in the method and apparatus for practicing my invention will be apparent to those skilled in the art. Therefore, I do not wish to be limited to the specific embodiments discussed herein but to the invention as described in the appended claims.

I claim:

1. In a method of lining pipe with cement wherein a cement slurry is centrifugally cast in said pipe under internal fluid pressure and said pressure is maintained until said cement has developed a compressive strength sufficient to resist collapse by said pipe when said pressure is released, the improvement comprising:

maintaining said pipe and said cement lining in a fixed relationship when said casting pressure is released therefrom.

2. The method of claim 1 wherein said fixed relationships is maintained by compressing said pipe longitudinally while said lining is being cast under pressure.

3. The method of claim 1 wherein said fixed relationships is maintained by internally upsetting the ends of said pipe, then compressing said pipe longitudinally before casting said slurry in said pipe.

4. The method of claim 2 wherein said pipe is compressed longitudinally by applying said casting pressure to a fluid motor pivoted on one end of said pipe and connected to the other end of said pipe in a manner whereby said pipe is compressed when fluid pressure is supplied to said motor.

5. In the method of lining pipe with cement wherein a cement slurry is centrifugally cast in said pipe under internal fluid pressure and said pressure is maintained until said cement has developed a compressive strength sufficient to resist collapse by said pipe when said pressure is released, the improvement comprising:

restrained differential movement of said pipe and said fluid lining when said casting pressure is released therefrom by internally upsetting the ends of said pipe before casting said cement slurry in said pipe.

6. The method of claim 5 wherein the ends of said pipe are upset by welding to the ends of said pipe a nipple having an internal diameter between that of said pipe and said cement lining.

7. The method of claim 5 wherein the ends of said pipe are upset by first making grooves inside said pipe, then placing rings in said grooves, the internal diameter of said rings being between the internal liameters of said pipe and said cement lining.

References Cited by the Examiner
UNITED STATES PATENTS

| | | | |
|---|---|---|---|
| 1,644,361 | 10/1927 | Talbot | 138—145 |
| 1,717,615 | 6/1929 | Millspaugh | 138—145 |
| 2,070,888 | 2/1937 | Eschenbrenner | 138—147 X |
| 2,486,420 | 11/1949 | Kennison | 25—38 |
| 2,557,544 | 6/1951 | Kennison | 264—270 |
| 2,569,612 | 10/1951 | Laurent | 138—176 X |
| 2,719,348 | 10/1955 | Desnos | 264—270 |
| 3,098,764 | 7/1963 | Kao et al. | 25—38 |

ROBERT F. WHITE, *Primary Examiner.*

ALEXANDER H. BRODMERKEL, *Examiner.*

A. L. LEAVITT, L. S. SQUIRES, *Assistant Examiners.*